(12) United States Patent
Colten et al.

(10) Patent No.: US 7,699,261 B2
(45) Date of Patent: Apr. 20, 2010

(54) SMALL UNMANNED AIRBORNE VEHICLE AIRFRAME

(75) Inventors: Todd M. Colten, St. Paul, MN (US);
Scott E. Morgan, St. Paul, MN (US);
Christopher A. Launer, Crystal, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 329 days.

(21) Appl. No.: 11/714,436

(22) Filed: Mar. 5, 2007

(65) Prior Publication Data
US 2008/0217486 A1  Sep. 11, 2008

(51) Int. Cl.
*B64C 39/00* (2006.01)
(52) U.S. Cl. .................. 244/45 R; 244/48
(58) Field of Classification Search ............. 244/124, 244/48, 131, 120, 118.2, 123; 446/34, 88, 446/93
See application file for complete search history.

(56) References Cited

U.S. PATENT DOCUMENTS

| 2,134,774 | A | * | 11/1938 | Beisel ................... 123/41.59 |
| 2,423,090 | A | * | 7/1947 | Fink et al. ................. 244/16 |
| 3,603,031 | A | * | 9/1971 | Fairbairn ................. 446/471 |
| 3,997,136 | A | * | 12/1976 | Finn et al. ............... 244/153 A |
| 5,035,382 | A | * | 7/1991 | Lissaman et al. ............ 244/190 |
| 5,395,073 | A | * | 3/1995 | Rutan et al. .................. 244/48 |
| 5,941,478 | A | * | 8/1999 | Schmittle .................... 244/48 |
| 5,975,464 | A | * | 11/1999 | Rutan ....................... 244/120 |
| 6,158,690 | A | * | 12/2000 | Wadey et al. ............. 244/17.27 |
| 6,460,445 | B1 | * | 10/2002 | Young et al. ................ 89/1.51 |
| 6,655,633 | B1 | * | 12/2003 | Chapman, Jr. ............ 244/123.9 |
| 6,779,757 | B2 | * | 8/2004 | Thomas, Jr. .............. 244/123.1 |
| 6,951,162 | B1 | * | 10/2005 | Shockey et al. ............ 89/36.11 |
| 2003/0146346 | A1 | * | 8/2003 | Chapman, Jr. .............. 244/123 |
| 2003/0173460 | A1 | * | 9/2003 | Chapman, Jr. .............. 244/123 |
| 2004/0000613 | A1 | * | 1/2004 | Thomas, Jr. .................. 244/10 |
| 2005/0153812 | A1 | | 7/2005 | Box et al. |
| 2006/0091258 | A1 | * | 5/2006 | Chiu et al. ................. 244/119 |
| 2007/0018049 | A1 | * | 1/2007 | Stuhr ........................ 244/124 |

(Continued)

FOREIGN PATENT DOCUMENTS

DE  30 39 403 A1  5/1982

(Continued)

OTHER PUBLICATIONS

Annex to Form PCT/ISA/206: Communication Relating to the Results of the Partial International Search issued by the International Searching Authority in the corresponding PCT International application on Dec. 5, 2008.

*Primary Examiner*—Michael R Mansen
*Assistant Examiner*—Justin Benedik
(74) *Attorney, Agent, or Firm*—Hamre, Schumann, Mueller and Larson (57) ABSTRACT

An unmanned aerial vehicle (UAV) is designed for low-speed, low altitude, long endurance missions typical to UAVs of this size and class. The UAV structure is configured to be substantially impervious to small arms fire and to have a very small representative radar cross-section. The UAV is modular such that the main wings and tail wing assembly are quickly and easily, detached from the fuselage for ease of transport and to provide an airframe that is quickly and easily adapted to any particular mission.

21 Claims, 11 Drawing Sheets

U.S. PATENT DOCUMENTS

2007/0268173 A1 * 11/2007 Randy .......................... 342/2
2008/0308676 A1 * 12/2008 Muller ....................... 244/119

FOREIGN PATENT DOCUMENTS

| | | | |
|---|---|---|---|
| DE | 3039403 A1 * | 5/1982 | |
| FR | 1059020 | 3/1954 | |
| FR | 1059020 A * | 3/1954 | |

* cited by examiner

SMALL UNMANNED AIRBORNE VEHICLE AIRFRAME

BACKGROUND OF THE INVENTION

1. Field of the Invention

This invention relates generally to unmanned aerial vehicles (UAVs), and more particularly to unmanned aerial vehicles designed for low-speed, low altitude, long endurance missions typical to UAVs of this size and class (sometimes called MALE UAVs).

2. Description of the Prior Art

Particular military and civil emergency environments sometimes require aerial response capabilities. One example might be a rescue at sea environment in which aerial sensing, targeting, detection and communication capability can directly or indirectly aid persons in peril. Time sensitive emergency operations in particular require highly accurate aerial sensing and data transmission, delivered preferably via highly mobile, man-portable, GPS-referenced, flexible aerial platforms capable of rapidly launching various payloads and sensors, and being readily adaptable to changes in mission objectives and payload requirements.

Surveillance capabilities in related applications that are essential to policing or peace-keeping, but generally not available to the average peace office or foot soldier, would include logistical or transit route survey, damage assessment, targeting, threat, and weather analysis.

Aerial sensing and data communications by use of unmanned aerial vehicles (UAVs) is often employed in emergency and hostile environments. Small UAVs are currently employed by various governments to achieve some of the benefits of such a vehicle, primarily in military and paramilitary operations. These UAVs are typically costly and have somewhat limited various operating parameters, including but not limited to, mission modularity, portability and survivability.

Accordingly, a need remains to provide an unmanned aerial vehicle (UAV) designed for low-speed, low altitude, long endurance missions within the aforementioned military and paramilitary and emergency response scenarios.

SUMMARY OF THE INVENTION

The present invention is directed to a small unmanned aerial vehicle (UAV) designed for low-speed, low altitude, long endurance missions typical to UAVs of this size and class. The UAV main wing and tail wing sections, in one embodiment, are constructed of molded STYROFOAM® (polystyrene foam) and laminated over with aircraft grade thin veneer Baltic birch plywood sheets to provide the requisite wing section strength. The fuselage, in one embodiment, is constructed of a molded composite comprising a honeycomb core surrounded on one side by a layer of carbon/aramid and surrounded on the other side by a layer of carbon/aramid and a layer of fiberglass. Although a carbon/aramid layer is employed, a carbon fiber KEVLAR® (para-aramid synthetic fiber) layer is even more preferred to enhance the overall strength of the structure. The fuselage may optionally employ one or more chine structures to aid the UAV maneuverability during its flight.

The landing gear, i.e. wheels, can be retractable or may be fixed depending upon the UAV application. Another UAV application may require the use of a rail launch type take-off and alternate type of landing system for the UAV.

The low-speed, low altitude, high endurance UAV is constructed to be quickly and easily assembled and dissembled. The main wings and the tail wing section, for example, may be attached and detached to the fuselage for ease of transport. This allows the type and composition of the wings to be changed out in order to meet the needs of a particular mission. Since the wings are easily interchangeable, and since the wings are constructed of inexpensive and easily obtainable resources, the overall cost of the UAV is substantially reduced below that necessary to provide a one size fits all type of design.

In one embodiment, a tailboom assembly includes a lightweight carbon fiber or aluminum tube that extends backward from each main wing. The tail wing section then attaches to the rear portion of the pair of tubes extending from the main wings to complete the tailboom assembly. The UAV then, includes 1) a fuselage, 2) a pair of main wings, and 3) a tailboom assembly comprising a pair of connection tubes and a tail wing section. The tail wing section is most preferably constructed in a fashion similar to that of the main wings, using the same materials. The fuselage, main wings and tailboom assembly can be connected using standard attachment hardware, i.e. various types of nuts, bolts and lock washers, or may be connected by using customized attachment mechanisms or any number of known clamping type mechanisms known to those skilled in the attachment hardware art.

Any number of engine types can be employed to power the UAV. The engine can, for example, be rear or front mounted and may include a single or multiple engines configured to power one or more propellers.

Accordingly, one aspect of the invention comprises providing a UAV having an airframe that is substantially impervious to small arms fire. Small arms fire will simply pass through the wing portions that comprise most of the air frame, leaving one or more small holes that will not substantially affect the path or flight worthiness of the UAV. A substantial portion (approximately 95%), of the UAV then, will not feel the full impact of any small arms fire. Other portions of the air frame are constructed similar to a bullet proof vest, such that small arms fire cannot penetrate the fuselage and damage any associated onboard control electronics or data collection and data communication systems.

Another aspect of the invention is directed to proving a UAV having a very small representative radar cross-section. The entire airframe, for example, can easily fit into a four foot cube. Further, the fuselage that houses the associated onboard electronic systems comprises only a small portion of the entire representative radar cross section.

Accordingly, a feature of the UAV includes survivability features uniquely adapted to substantially eradicate the dangers generally associated with small arms fire.

Another feature of the UAV includes the provision of an airframe that has a very small representative radar cross-section.

Yet another feature of the UAV includes the provision of an airframe that is modular such that the main wings and the entire tail wing assembly can be dissembled from the fuselage for ease of manual transport.

Still another feature of the UAV includes the provision of an airframe that is very easily adaptable to accommodate any number of desired mission statements.

BRIEF DESCRIPTION OF THE DRAWINGS

Other aspects, features and advantages of the present invention will be readily appreciated as the invention becomes better understood by reference to the following detailed description when considered in connection with the accompanying drawing figures wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
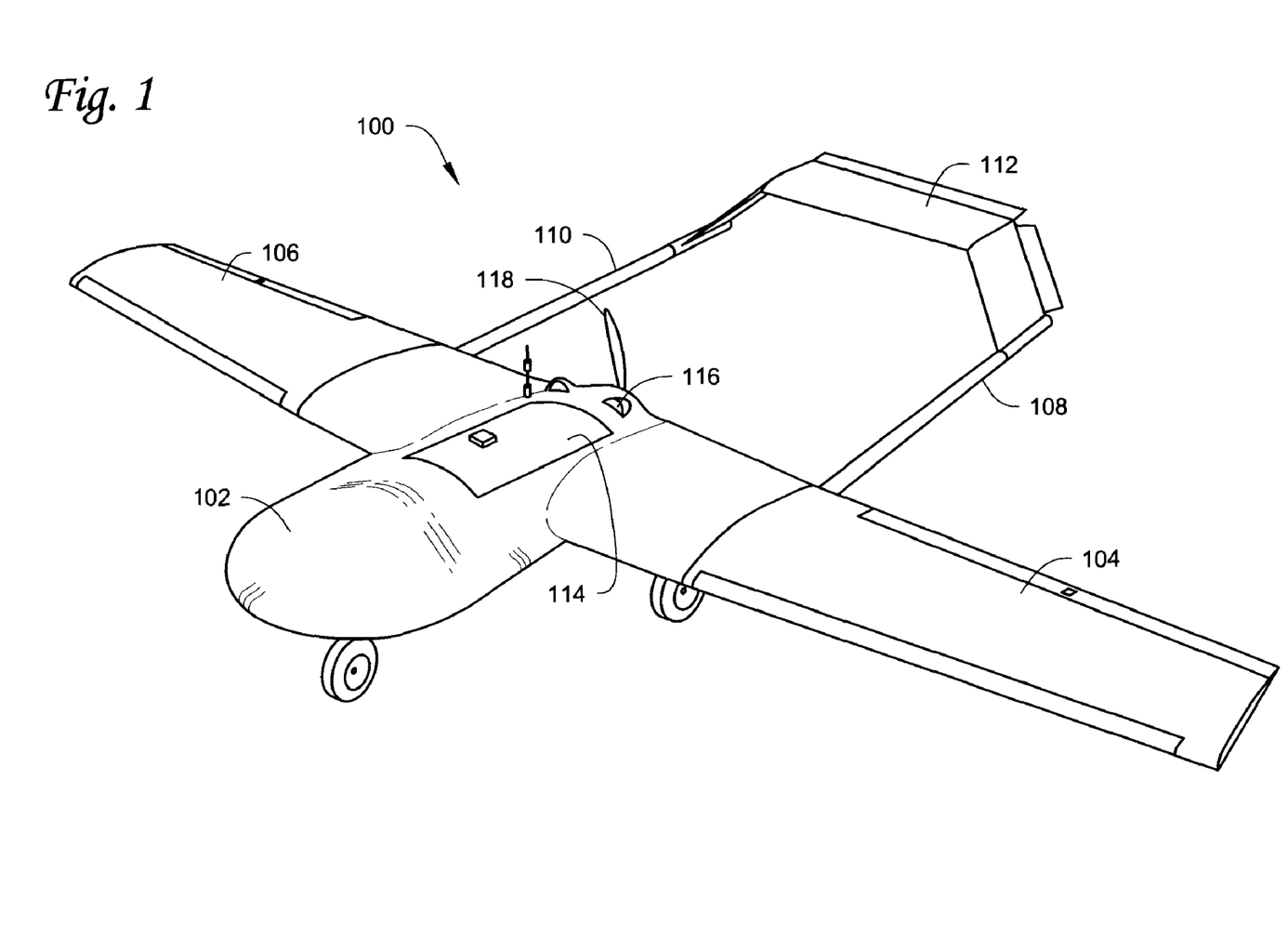
FIG. 1 is a frontal perspective view illustrating an unmanned aerial vehicle according to one embodiment of the present invention.

Looking now at FIG. 1, a frontal perspective view of an unmanned aerial vehicle (UAV) 100 is illustrated in accordance with one embodiment of the present invention. The UAV 100 is generally comprised of a fuselage 102, a left main wing 104, a right main wing 106, a left tail boom 108, a right tail boom 110, and a tail wing 112. The fuselage 102 is configured to carry a payload having access through an upper fuselage panel 114 that can be configured to be opened or removed as desired. The UAV 100 is powered via a rear mounted gasoline engine 116 that is configured to operate a propeller 118. The UAV 100 most preferably is small enough to be manually transported in either its fully assembled mode or in its modular break-down mode. The UAV 100 is most preferably modular such that each of the major units 102, 104, 106, 108, 110 and 112 referenced herein before is removable and replaceable independent of the other units, and may be optimized to particular performance requirements of specific uses. Particular parts and components of the embodiments described herein below are herein after referred to as assemblies. The word assembly, as used herein, means the totality of related parts and pieces related to a given component and its operability and is not to be considered as limiting to a particular part, piece, or operation.

Figure 2:
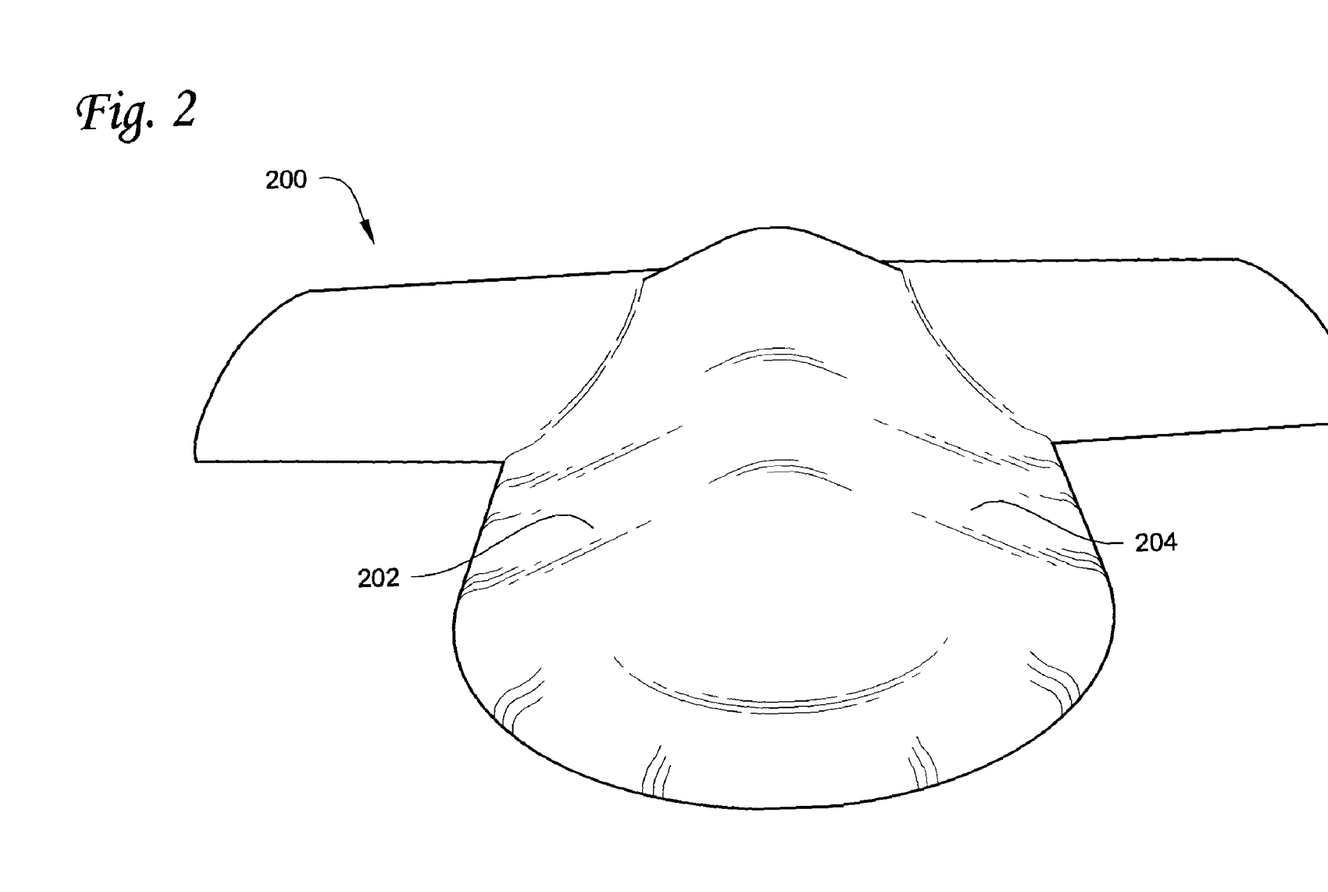
FIG. 2 is a frontal perspective view illustrating a fuselage half-shell suitable for implementing the fuselage portion of the UAV shown in FIG. 1.

FIG. 2 is a frontal perspective view illustrating a fuselage half-shell 200 suitable for implementing the fuselage portion 102 of the UAV 100 shown in FIG. 1. The fuselage half-shell 200 can be seen to employ a chine structure 204 on its left side and another chine structure 202 on its right side. Those skilled in the avionics arts will readily appreciate the enhanced flight capabilities provided via such structures; and so further discussion of chines will not be included in order to enhance clarity and to preserve brevity in describing the embodiments discussed herein with reference to the figures.

Figure 3:
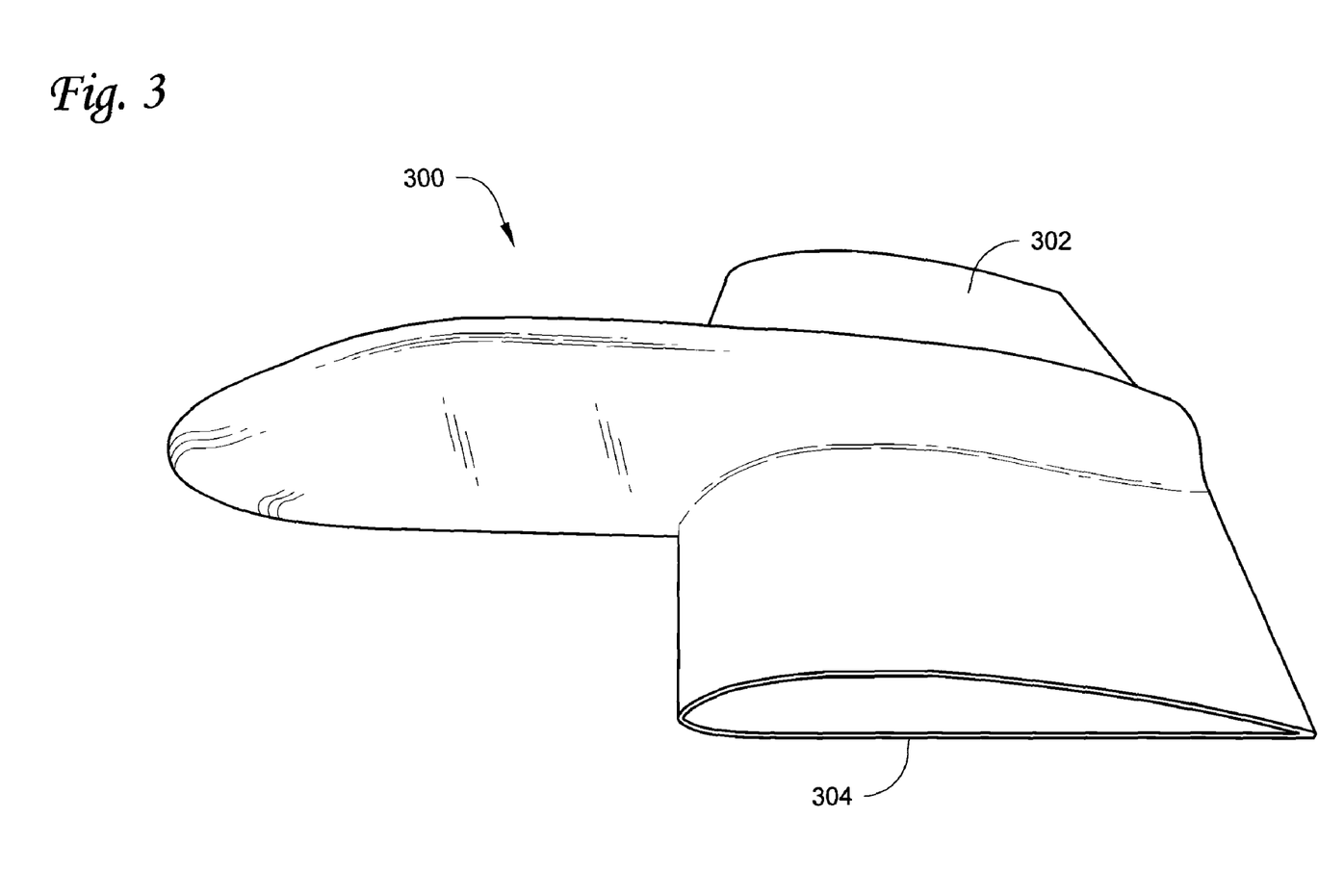
FIG. 3 is a side perspective view illustrating the fuselage portion of the UAV shown in FIG. 1 and that is formulated using a pair of fuselage half-shells such as shown in FIG. 2.

FIG. 3 is a side perspective view 300 illustrating the fuselage portion 102 of the UAV 100 shown in FIG. 1 and that is formulated using a pair of fuselage half-shells 200 such as shown in FIG. 2. Perspective view 300 can be seen to illustrate an upper fuselage shell 302 and a lower fuselage shell 304. The upper shell 302 is bonded to the lower shell 304 during assembly of the fuselage assembly 102. Each fuselage shell 302, 304, is constructed of a molded composite comprising a honeycomb core surrounded on one side by a layer of carbon/aramid and surrounded on the other side by a layer of carbon/aramid and a layer of fiberglass. Although a carbon/aramid layer may be employed, a carbon fiber KEVLAR® (para-aramid synthetic fiber) layer, as stated herein before, is even more preferred to enhance the overall strength of the structure 300.

Figure 4:
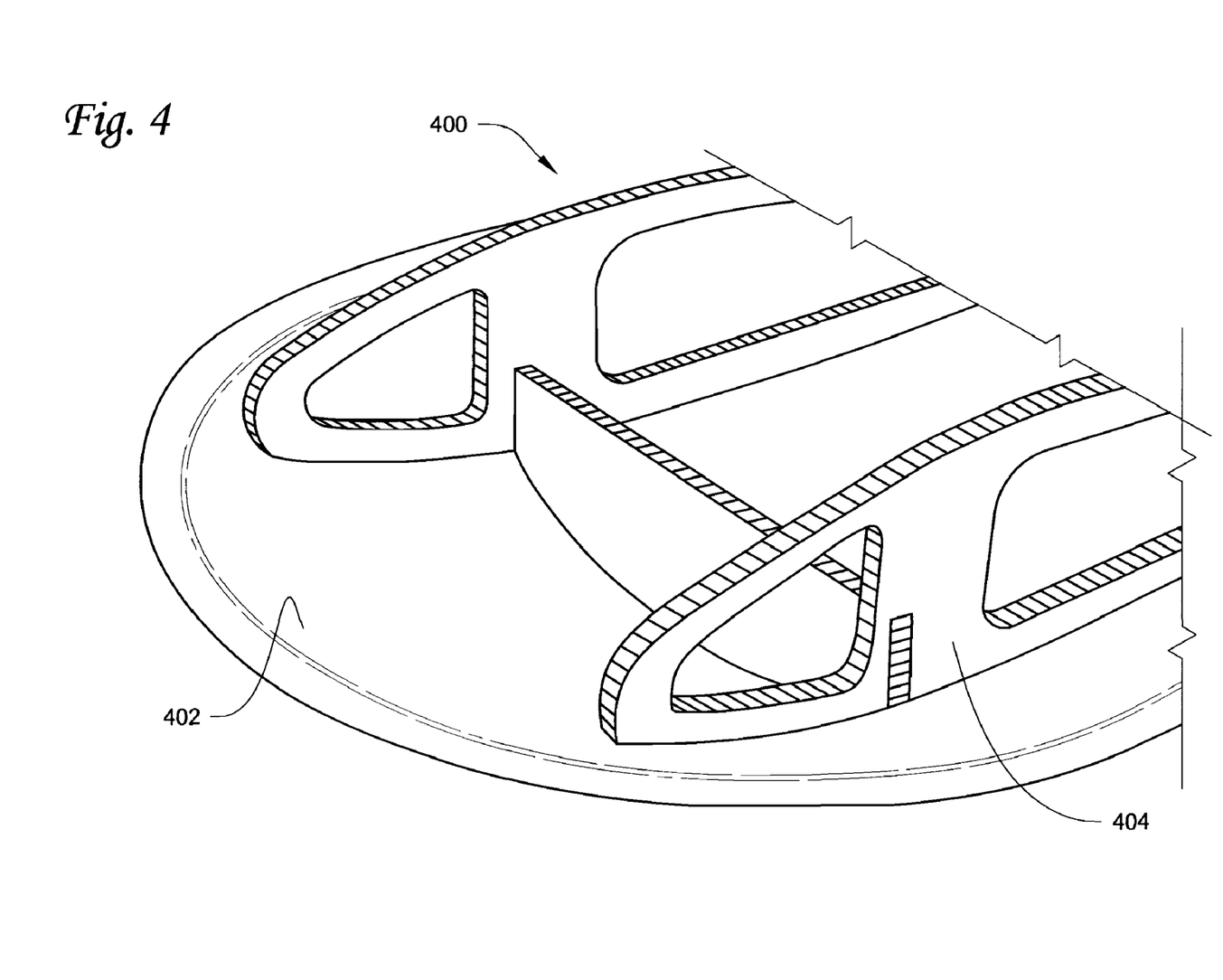
FIG. 4 illustrates a portion of the internal structure used to implement the fuselage shown in FIG. 3.

FIG. 4 illustrates a portion of the internal structure 400 used to implement the fuselage structure 300 shown in FIG. 3. Each internal skeleton structure 404 comprises a foam core that is covered on each side via aircraft grade Baltic birch plywood veneer sheeting to provide both the requisite strength and the requisite weight characteristics. Skeletal structures 404 can be seen bonded to the inside of the lower fuselage shell 304. The underside of the upper fuselage shell 302 is similarly bonded to the upper portions of the skeletal structures 404.

Figure 5:
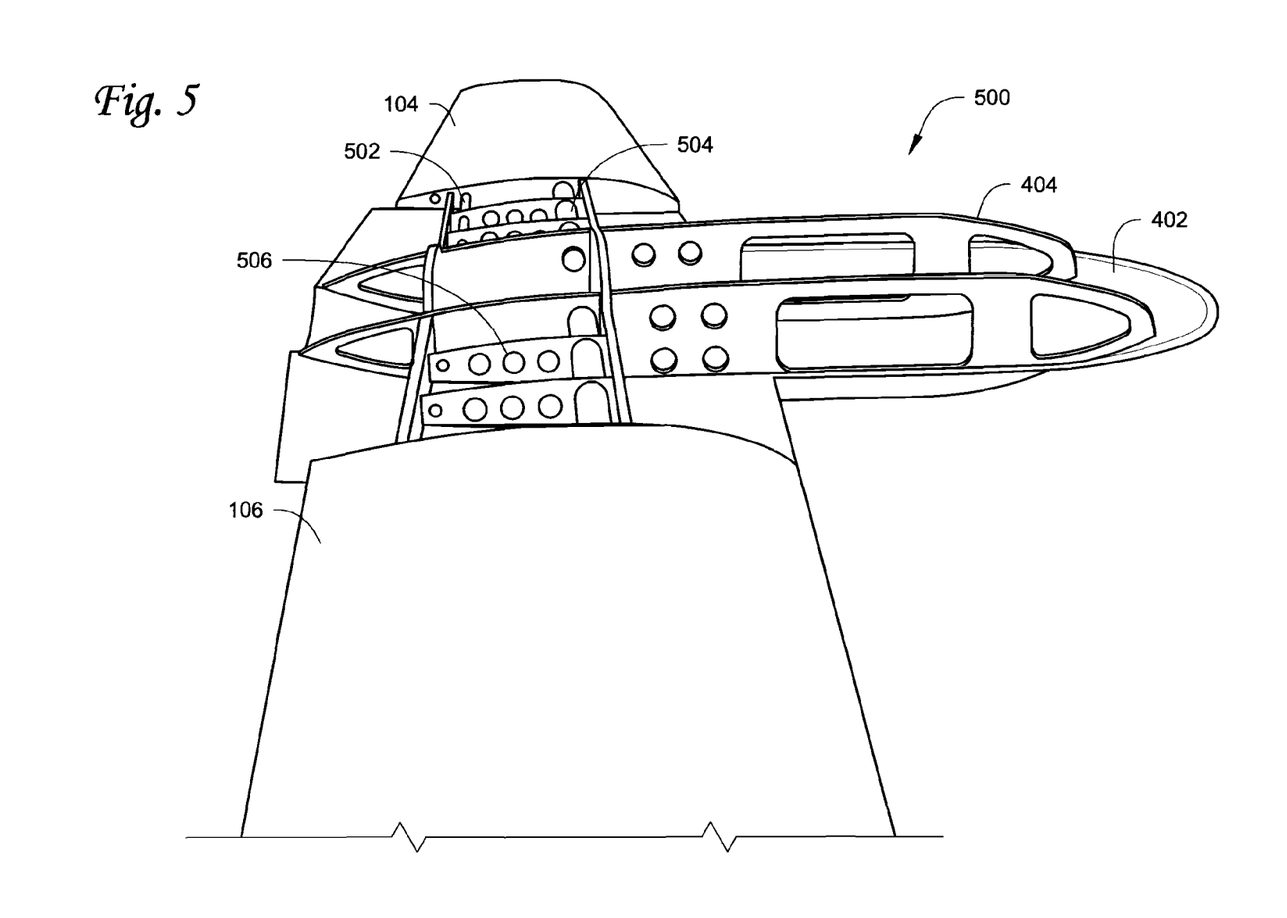
FIG. 5 is a more detailed view of the internal structure used to implement the fuselage shown in FIG. 3.

Moving now to FIG. 5, a side perspective view 500 of the internal skeletal structures 404 used to implement the fuselage 102 shown in FIG. 1 are illustrated in more detail. Also shown are left and right skeletal structures having circular through holes 506 that are used to contain sets of large and small tubes 504, 502 to provide the requisite structural integrity between the fuselage 102 and the left and right main wings 104, 106. The tubes 502, 504 can be formulated from any suitable lightweight material such as, for example, but not limited to, thin wall aluminum, or carbon fiber material. Only the lower fuselage shell 402 is depicted in FIG. 5.

Figure 6:
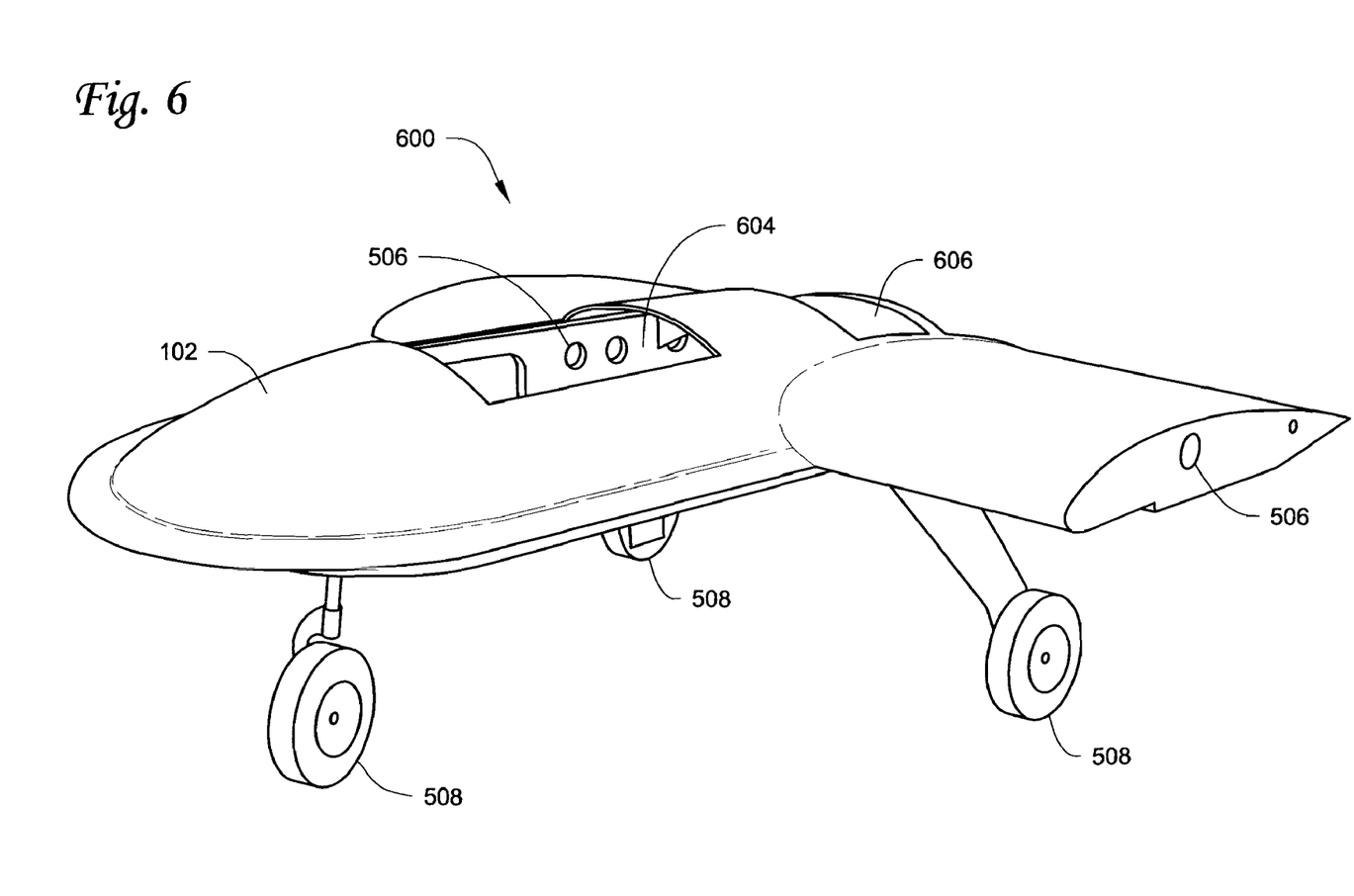
FIG. 6 is a frontal perspective view exposing a portion of the internal structure of the fuselage portion of the UAV.

FIG. 6 is a frontal perspective view 600 exposing circular through holes 506 associated with a portion of one internal skeletal structure of the UAV fuselage 102. Circular through holes 506 can also be seen at the extremities of the main wing attachment portion of the fuselage 102. Strength enhancement tubes 502, 504, as stated herein before are inserted into the through holes 506 and protrude beyond the extremities of the main wing attachment portion of the fuselage to provide structural integrity between the fuselage 102 and the main wings 104, 106 subsequent to attachment.

The fuselage panel 114 is shown removed from the upper fuselage shell 102 to reveal the payload access opening 604. The UAV modularity thus allows the easy insertion, removal, and substitution of any number of desired payloads, including but not limited to, different types of navigational systems such as GPS. The particular payload will most preferably employ an application specific computer system that allows the flight modes, flight path, and UAV application, among other duties to be modified, if desired, from one or more ground control stations. Other types of computer systems may also be employed if desired, that are for example, disposable upon completion of the requisite task(s), or that are limited solely to a single specific application.

Also seen is an engine access opening 606 at the rear of the fuselage shell 102. The position of the access panel 606 opening is suitable for installation of a push type engine assembly. The present invention is not so limited however, and it shall be understood that access panel 606 could just as easily be located near the frontal portion of the fuselage 102, allowing for use of pull type engine assemblies. The landing gear 508, as also stated herein before, may be either retractable or fixed. The present invention is not so limited however, and it shall be understood that other types of landing apparatus may instead be employed depending upon the particular application envisioned or required. A rail type landing system, for example, can also be used to accommodate a different application.

Figure 7A:
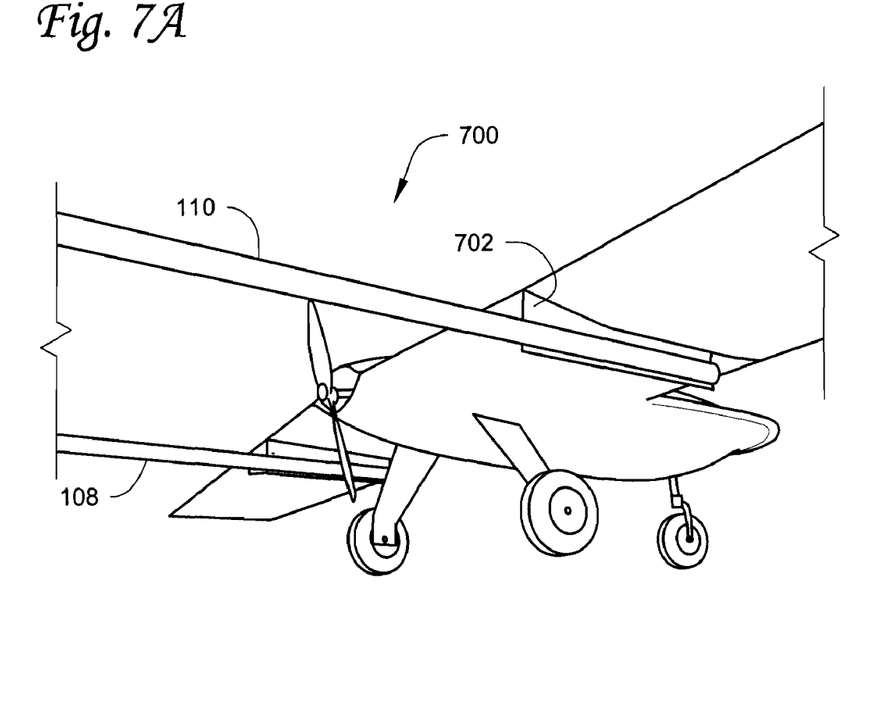
FIG. 7A is a rear perspective view exposing the underside of the fuselage portion of the UAV shown in FIG. 1 and illustrating attachment of the tail boom assembly to the fuselage.
Figure 7B:
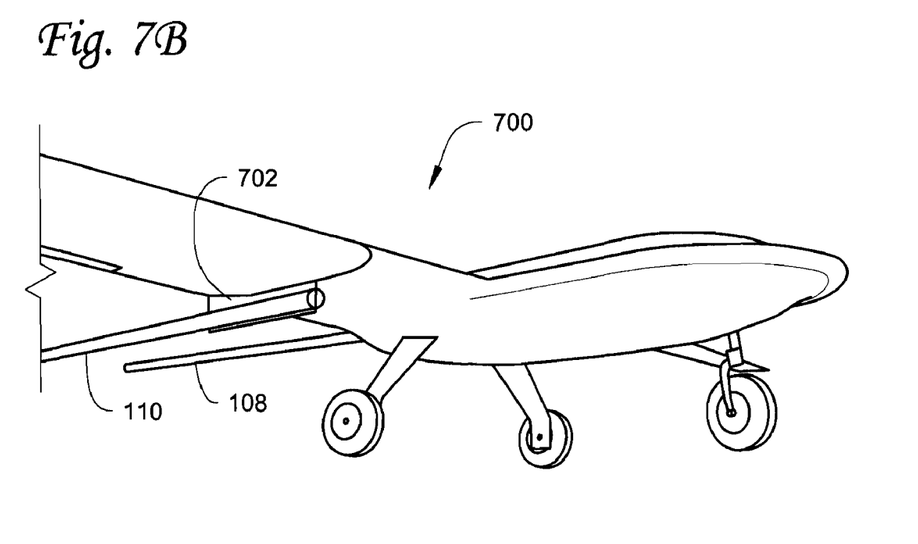
FIG. 7B is a frontal perspective view exposing the underside of the fuselage portion of the UAV shown in FIG. 1 and illustrating attachment of the tail boom assembly to the fuselage.

FIGS. 7A and 7b show rear and frontal perspective views 700 exposing the underside of the fuselage portion of the UAV 100 shown in FIG. 1 and illustrating attachment of the tail booms 108, 110 to the fuselage 102. Each tail boom 108, 110 can be seen to employ a mounting plate 702. Each mounting plate 702 includes through holes that match up with the UAV skeletal structure through holes 506 such that the mounting plate 702 is compressed between the main wings 104, 106 upon attachment of the main wings 104, 106 to the fuselage 102. Strength enhancement tubes 502, 504 then pass through the main wings 104, 106 and on through each mounting plate 702 before extending further into the fuselage skeletal structure(s) 404 via through holes 506. The mounting plates 702 can be formulated using any suitable low-weight, high-strength material such, but not limited to, thin wall aluminum or a carbon fiber composite material.

Figure 8:
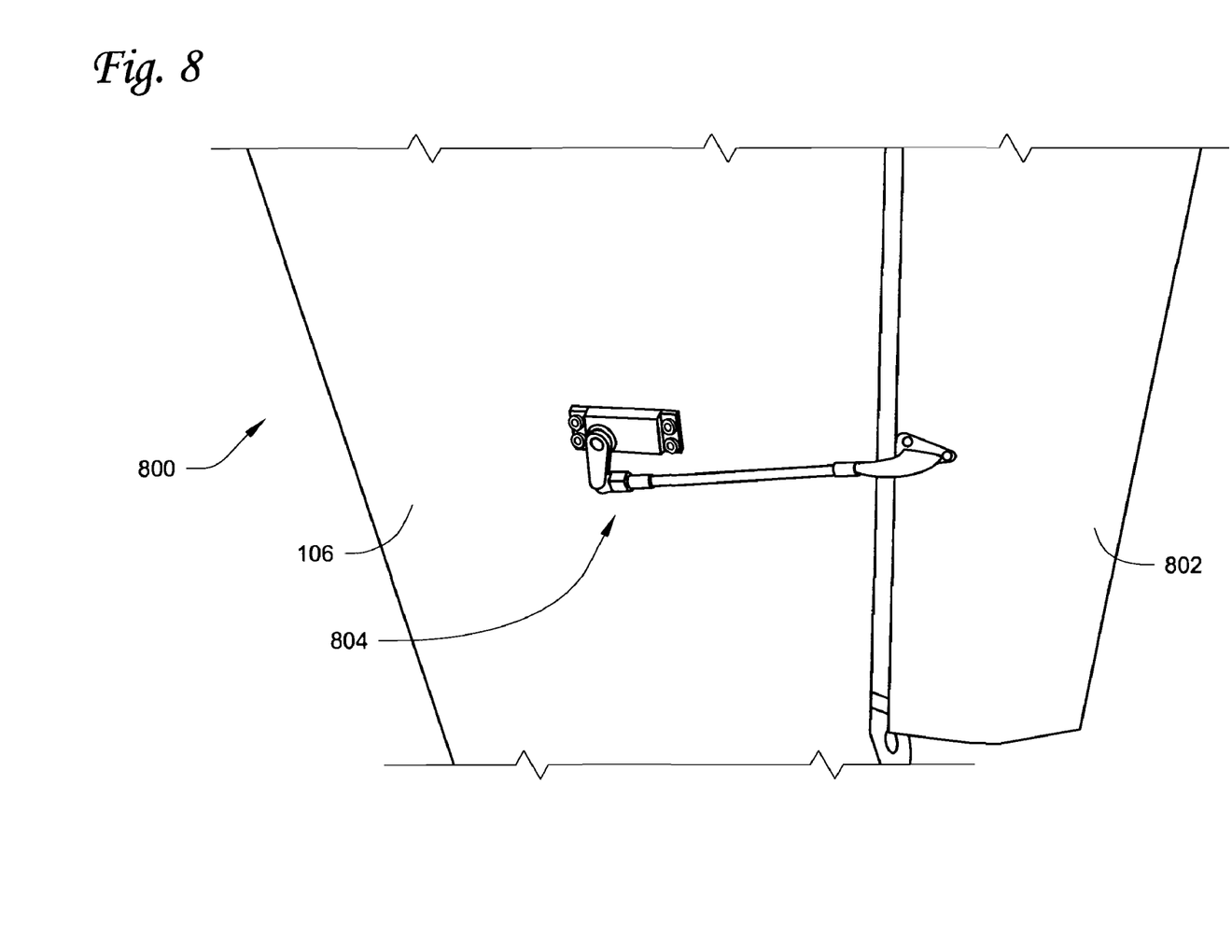
FIG. 8 illustrates a typical servo and control surface installation suitable for use with the UAV shown in FIG. 1.

FIG. 8 illustrates a typical servo and control surface installation 800 suitable for use with the UAV 100 shown in FIG. 1. A main wing section 106 can be seen to also include a rear wing flap 802 that is controlled via a servo control assembly 804 to move the flap 802 up or down as desired. Servo control assemblies such as shown are well known in the art, and so further details regarding servo control assemblies will not be discussed in further detail in order to preserve brevity and to enhance clarity in describing the embodiments discussed herein.

Figure 9A:
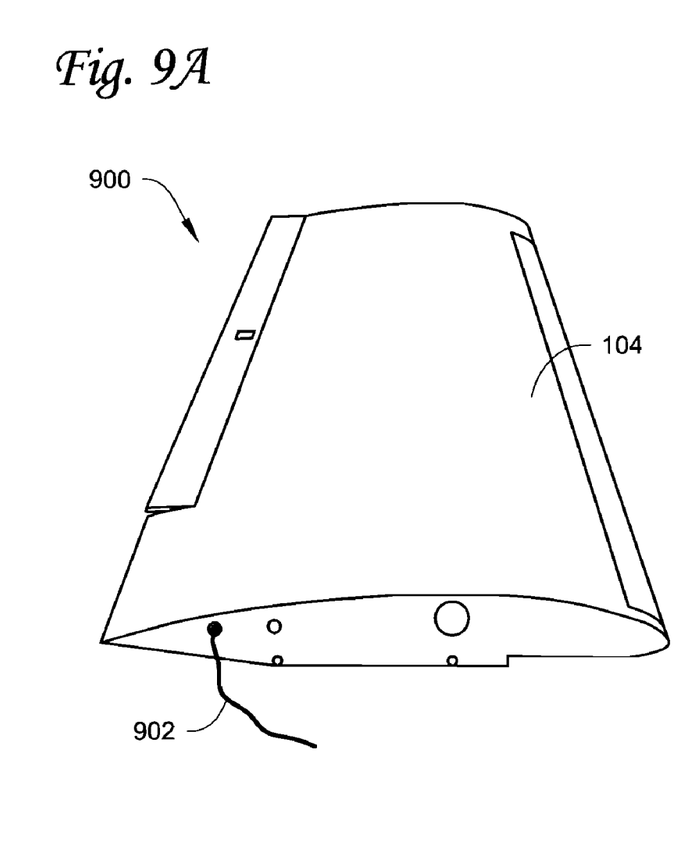
FIG. 9A is a perspective view showing a left main wing suitable for use with the UAV shown in FIG. 1.
Figure 9B:
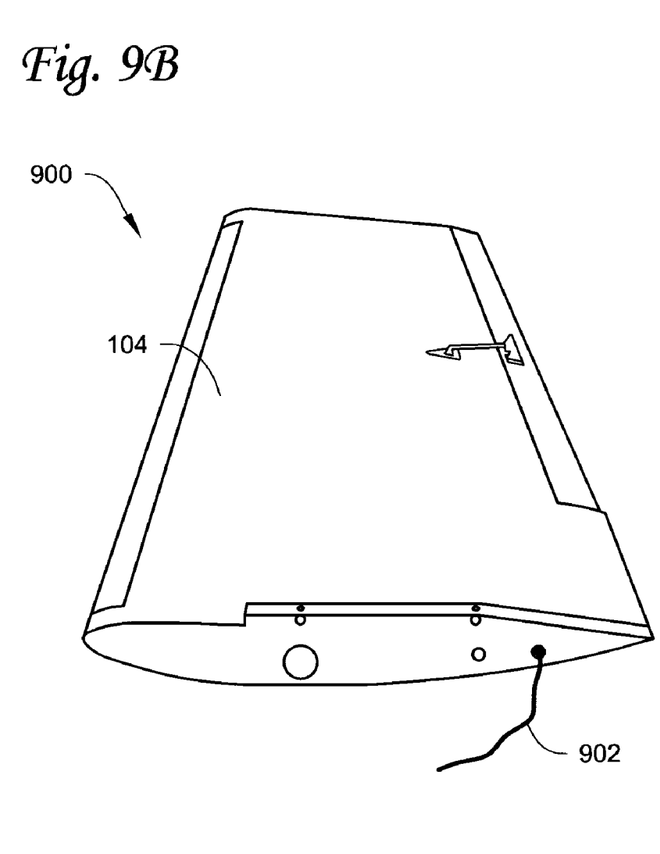
FIG. 9B is a perspective view showing the underside of the left main wing.

FIGS. 9A and 9B are top and bottom perspective views 900 showing the left main wing 104 suitable for use with the UAV 100 shown in FIG. 1. The right main wing 106 has a similar construction. The main wing 104 can be seen to have a servo control wire 902 extending there from respectively. The servo control wire 902 connects to the requisite computer control system hardware, not shown, necessary for command and control of the UAV flight path.

The main wings 104, 106, as stated herein before, are formulated in a manner that provides an airframe that is substantially impervious to small arms fire. During its mission, any small arms fire will simply penetrate the wing portions 104, 106 that comprise most of the air frame surface, leaving one or more small holes that will not substantially affect the path or flight worthiness of the UAV 100. Other portions of the air frame, including the fuselage 102, are constructed in similar fashion to a bullet proof vest, such that small arms fire cannot penetrate the fuselage 102 and damage any associated payload such as onboard control electronics or data collection and data communication systems. Accordingly, a significant feature of the UAV 100 includes survivability features uniquely adapted to substantially eradicate the dangers generally associated with small arms fire.

UAV 100 most preferably has a very small representative radar cross-section. In one embodiment, the entire assembled airframe including main wings 104, 106, for example, can easily fit into a four foot cube. Further, the fuselage 102 that houses the associated onboard electronic systems comprises only a small portion of the entire representative radar cross section.

The UAV airframe is modular such that the main wings 104, 106 and the entire tail wing assembly, discussed further herein below with reference to FIG. 11, can be dissembled from the fuselage 102 for ease of manual transport. This modularity is beneficial in that the main wings 104, 106 can quickly and easily be removed or replaced with different sets of wings more suitable for a particular mission. In view of the foregoing, the present inventor envisions use of a single hand tool that is suitable to dissemble and assemble the UAV 100 in order to minimize the time and cost(s) associated with the assembly and disassembly procedure(s).

Figure 10:
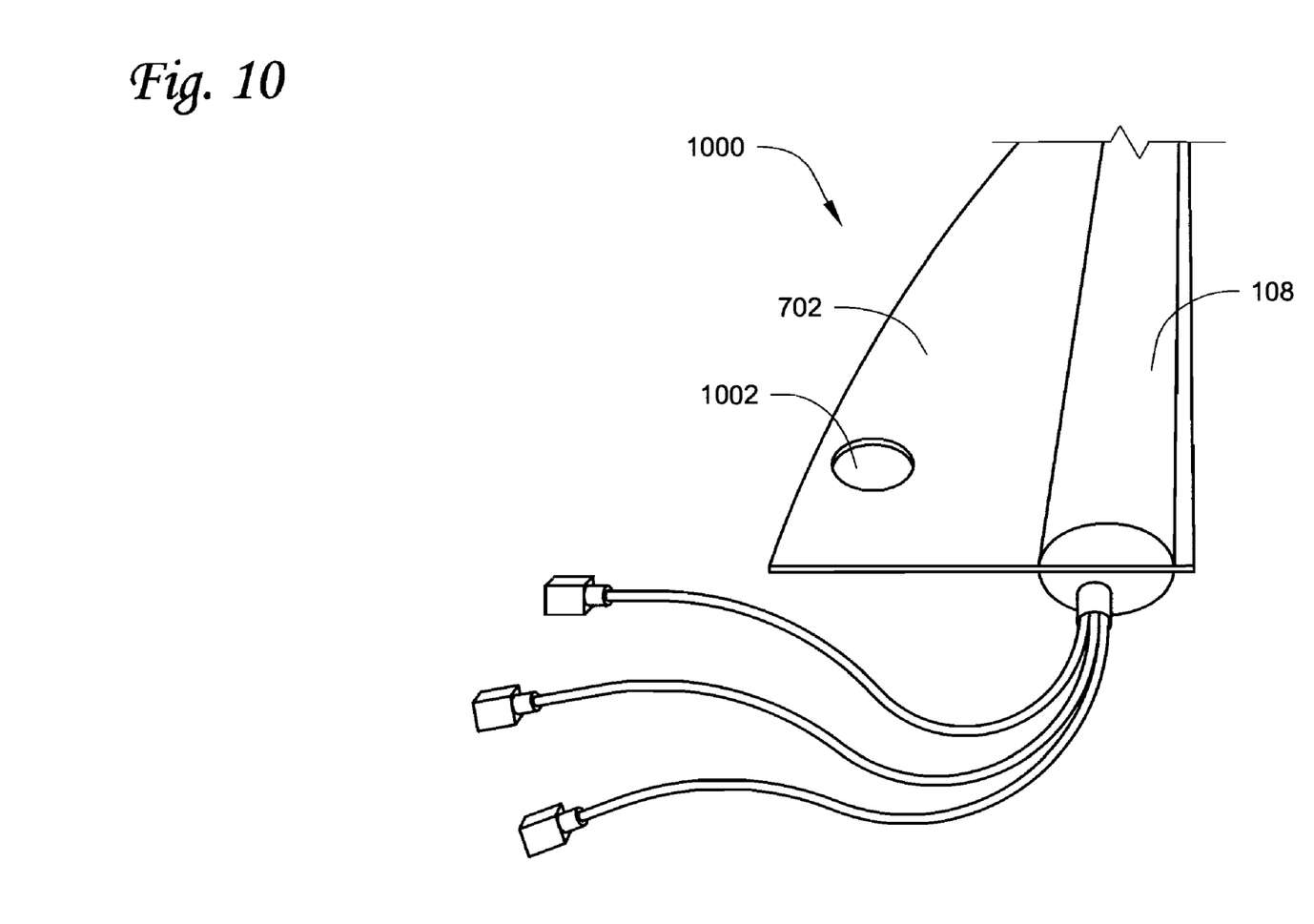
FIG. 10 illustrates one portion of a tail boom suitable for use to implement the tail boom assembly portion of the UAV shown in FIG. 1.

FIG. 10 is a perspective view 1000 illustrating one portion of a tail boom 108 suitable for implementing the tail boom assembly portion of the UAV 100 shown in FIG. 1. The tail boom 108 can be seen to include a mounting plate 702 that has been bonded to the tail boom 108. One through hole 1002 is shown in the mounting plate 702. The mounting plate 702 can be bonded to the tail boom 108 in any suitable manner, including but not limited to, use of bonding cement, or use of aircraft grade fastening hardware. Use of particular non-metallic, light-weight aircraft grade bonding materials are most preferred to help reduce the representative radar cross-section of the UAV 100.

Figure 11A:
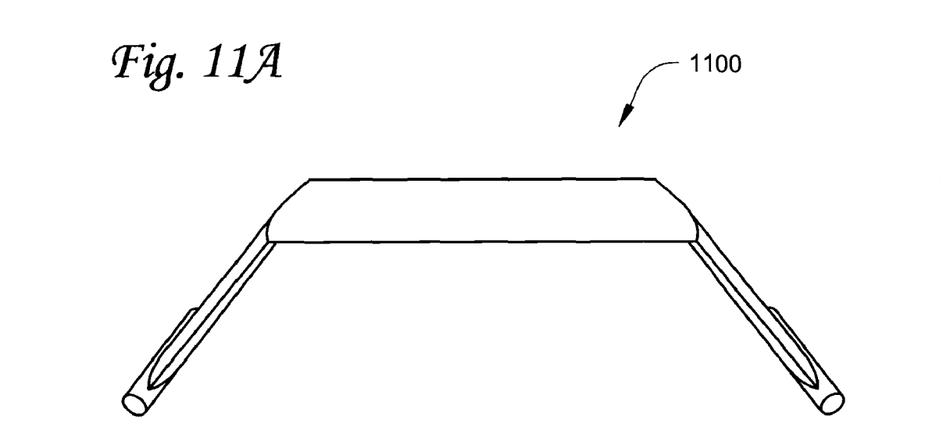
FIGS. 11A-11C illustrate various perspective views of a tail wing suitable for use with the UAV shown in FIG. 1.
Figure 11B:
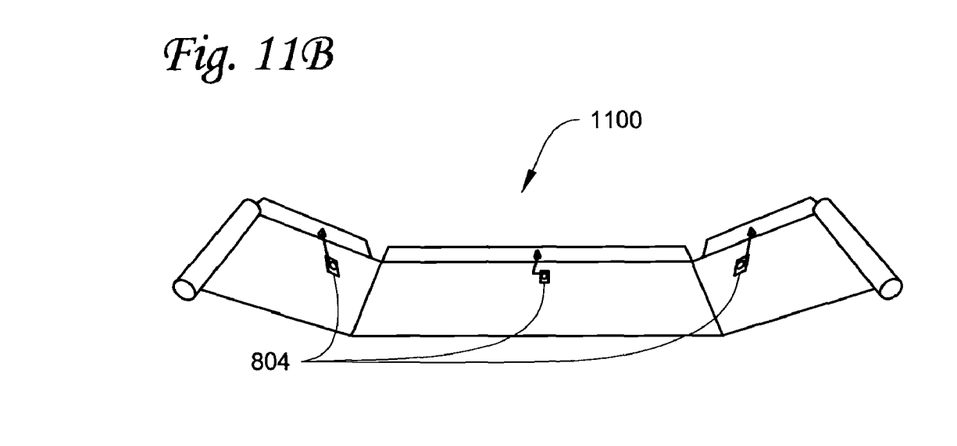
Figure 11C:
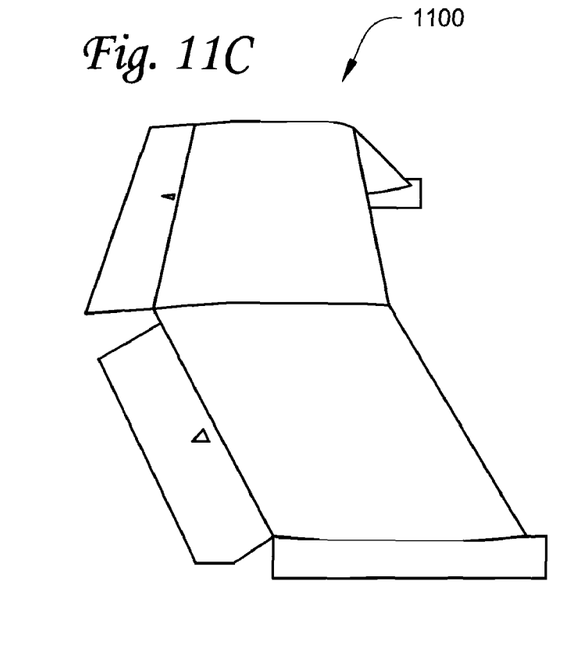

FIGS. 11A-11C illustrate various perspective views of a tail wing 1100 suitable for use with the UAV 100 shown in FIG. 1. The tail wing section 1100 is most preferably constructed in a fashion similar to that of the main wings 104, 106, using the same type of materials in order to enhance the survivability characteristics of the UAV 100 against small arms fire, and to substantially reduce the representative radar cross-section of the UAV 100.

In summary explanation, a small unmanned aerial vehicle (UAV) is designed for low-speed, low altitude, long endurance missions typical to UAVs of this size and class. The UAV main wing and tail wing sections, in one embodiment, are constructed of molded STYROFOAM® (polystyrene foam) and laminated over with aircraft grade thin veneer Baltic birch plywood sheets to provide the requisite wing section strength. The fuselage, in one embodiment, is constructed of a molded composite comprising a honeycomb core surrounded on one side by a layer of carbon/aramid and surrounded on the other side by a layer of carbon/aramid and a layer of fiberglass. Although a carbon/aramid layer is employed, a carbon fiber KEVLAR® (para-aramid synthetic fiber) layer is even more preferred to enhance the overall strength of the structure. The fuselage may optionally employ one or more chine structures to aid the UAV maneuverability during its flight.

The landing gear, i.e. wheels, can be retractable or may be fixed depending upon the UAV application. Another UAV application may require the use of a rail launch type take-off and alternate type of landing system for the UAV.

The low-speed, low altitude, high endurance UAV is constructed to be quickly and easily assembled and dissembled. The main wings and the tail wing section, for example, may be attached and detached to the fuselage for ease of transport. This allows the type and composition of the wings to be changed out in order to meet the needs of a particular mission. Since the wings are easily interchangeable, and since the wings are constructed of inexpensive and easily obtainable resources, the overall cost of the UAV is substantially reduced below that necessary to provide a one size fits all type of design.

In one embodiment, a tailboom assembly includes a lightweight carbon fiber or aluminum tube that extends backward from each main wing. The tail wing section then attaches to the rear portion of the pair of tubes extending from the main wings to complete the tailboom assembly. The UAV then, includes 1) a fuselage, 2) a pair of main wings, and 3) a tailboom assembly comprising a pair of connection tubes and a tail wing section. The tail wing section is most preferably constructed in a fashion similar to that of the main wings, using the same materials. The fuselage, main wings and tailboom assembly can be connected using standard attachment hardware, i.e. various types of nuts, bolts and lock washers, or may be connected by using customized attachment mechanisms or any number of known clamping type mechanisms known to those skilled in the attachment hardware art.

Any number of engine types can be employed to power the UAV. The engine can, for example, be rear or front mounted and may include a single or multiple engines configured to power one or more propellers.

In view of the above, it can be seen the present invention presents a significant advancement in the art of UAV design. Further, this invention has been described in considerable detail in order to provide those skilled in the UAV art with the information needed to apply the novel principles and to construct and use such specialized components as are required.

It should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

The wing assemblies, for example, although described as formulated using a STYROFOAM® (polystyrene foam) core overlaid with aircraft grade plywood, can just as easily be formulated using any other materials suitable for use in fabricating UAV wing assemblies so long as the wing assemblies conform with the modularity, survivability and representative radar cross-section principles set forth herein before.

What is claimed is:

1. An unmanned aerial vehicle (UAV) comprising:
   a fuselage assembly;
   a left main wing assembly attached to the fuselage;
   a right main wing assembly attached to the fuselage;
   a first tail boom assembly having a first end and a second end;
   a second tail boom assembly having a first end and a second end;
   a first mounting plate attached to the first tail boom assembly at the first end thereof;
   a second mounting plate attached to the second tail boom assembly at the first end thereof;
   wherein the first mounting plate is disposed between the left main wing assembly and the fuselage assembly and the second mounting plate is disposed between the right main wing assembly and the fuselage assembly;
   the first mounting plate and the second mounting plate each includes a plurality of through holes, and a plurality of tubes extend from the fuselage assembly through the through holes in the first and second mounting plates and into the left and right main wing assemblies; and
   a tail wing assembly attached to the second ends of the first and second tail boom assemblies; wherein the fuselage assembly, left main wing assembly, right main wing assembly, first tail boom assembly, second tail boom assembly and tail wing assembly are modular such that each assembly is detachably connected and may be replaced by similar assemblies having alternative configurations and capabilities.

2. The UAV according to claim 1, wherein the right main wing assembly, left main wing assembly and tail wing assembly are each comprised of a polystyrene foam core overlaid with aircraft grade plywood veneer.

3. The UAV according to claim 1, wherein the fuselage assembly is configured with exterior chine structures configured to enhance maneuverability and to reduce overall representative radar cross-section.

4. The UAV according to claim 1, wherein the fuselage assembly includes a payload access opening covered by a removable access panel.

5. The UAV according to claim 1, wherein the fuselage assembly includes an engine access opening covered by a removable access panel, and an engine connected to the fuselage assembly.

6. The UAV according to claim 5, wherein the engine comprises a push-type engine.

7. The UAV according to claim 5, wherein the engine comprises a pull-type engine.

8. The UAV according to claim 1, wherein the fuselage assembly includes a plurality of skeleton structures, the skeleton structures including a plurality of aligned through holes formed therein; the right main wing assembly and the left main wing assembly each includes a plurality of holes aligned with the through holes in the skeleton structures; the through holes of the first mounting plate and the second mounting plate are aligned with the through holes in the skeleton structures; and the plurality of tubes extend through the through holes in the skeleton structures and into the holes in the right main wing assembly and the left main wing assembly and through the through holes in the first mounting plate and the second mounting plate.

9. The UAV according to claim 8, wherein the tubes have different cross-sectional sizes.

10. An unmanned aerial vehicle (UAV) comprising:
    a fuselage assembly;
    a left main wing assembly removably attached to the fuselage;
    a right main wing assembly removably attached to the fuselage; and
    a tail wing assembly that includes a first tail boom assembly connected to a first mounting plate that is compressed between the left main wing assembly and the fuselage assembly, a second tail boom assembly connected to a second mounting plate that is compressed between the right main wing assembly and the fuselage assembly, and a tail wing section connected to the first and second tail boom assemblies; and
    the first mounting plate and the second mounting plate each includes a plurality of through holes, and a plurality of tubes extend from the fuselage assembly through the through holes in the first and second mounting plates and into the left and right main wing assemblies.

11. The UAV according to claim 10, wherein the fuselage assembly, left main wing assembly, right main wing assembly, and tail wing assembly are modular such that each assembly is detachably connected and may be replaced by similar assemblies having alternative configurations and capabilities.

12. The UAV according to claim 10, wherein the right main wing assembly, left main wing assembly and tail wing assembly are each comprised of materials substantially impervious to small arms fire, such that the small arms fire will pass through the wing assemblies without the UAV being substantially impacted by the full force of the small arms fire.

13. The UAV according to claim 10, wherein the surface of the fuselage assembly is configured with chines to enhance maneuverability and to reduce the overall UAV representative radar cross-section.

14. The UAV according to claim 10, wherein the fuselage assembly includes a payload access opening covered by a removable access panel.

15. The UAV according to claim 10, wherein the fuselage assembly includes an engine access opening covered by a removable access panel, and an engine connected to the fuselage assembly.

16. The UAV according to claim 10, wherein the fuselage assembly includes a plurality of skeleton structures, the skeleton structures including a plurality of aligned through holes formed therein; the right main wing assembly and the left main wing assembly each includes a plurality of holes aligned with the through holes in the skeleton structures; the through holes of the first mounting plate and the second mounting plate are aligned with the through holes in the skeleton structures; and the plurality of tubes extend through the through holes in the skeleton structures and into the holes in the right main wing assembly and the left main wing assembly and through the through holes in the first mounting plate and the second mounting plate.

17. The UAV according to claim 16, wherein the tubes have different cross-sectional sizes.

18. A method of assembling a UAV, the method comprising the steps of:
providing a modular fuselage assembly, a modular left main wing assembly, a modular right main wing assembly, first and second modular tail boom assemblies each having a mounting plate attached thereto, and a modular tail wing assembly, each mounting plate includes a plurality of through holes;
disposing the mounting plate of the first modular tail boom assembly between the modular left main wing assembly and the fuselage assembly;
disposing the mounting plate of the second modular tail boom assembly between the modular right main wing assembly and the fuselage assembly;
removably attaching the modular left and right main wing assemblies to the modular fuselage assembly with the respective mounting plates disposed therebetween by installing a plurality of tubes that extend from the modular fuselage assembly through the through holes in the mounting plates and into the modular left and right main wing assemblies;
and
removably attaching the modular tail wing assembly to each modular tail boom assembly.

19. An unmanned aerial vehicle (UAV), comprising:
a modular fuselage assembly including upper and lower fuselage shells, the lower fuselage shell is constructed of a molded composite that includes a honeycomb core surrounded on one side by a layer of carbon/aramid and surrounded on the other side by a layer of carbon/aramid and a layer of fiberglass;
a modular left main wing assembly removably attached to the modular fuselage assembly and configured to allow penetration of small arms fire;
a modular right main wing assembly removably attached to the modular fuselage assembly and configured to allow penetration of small arms fire; and
a modular tail wing assembly that includes a first tail boom assembly connected to a first mounting plate that is disposed between the modular left main wing assembly and the modular fuselage assembly, a second tail boom assembly connected to a second mounting plate that is disposed between the modular right main wing assembly and the modular fuselage assembly, and a tail wing section connected to the first and second tail boom assemblies; and
the first mounting plate and the second mounting plate each includes a plurality of through holes, and a plurality of tubes extend from the modular fuselage assembly through the through holes in the first and second mounting plates and into the modular left and right main wing assemblies.

20. The UAV according to claim 19, wherein the modular fuselage assembly, modular left main wing assembly, modular right main wing assembly, and modular tail wing assembly are configured to allow replacement by similar assemblies having alternative configurations and capabilities.

21. The UAV according to claim 19, wherein each modular wing assembly has a wing section comprising a solid foam material core laminated over with aircraft grade plywood.

* * * * *